United States Patent
Karunakaran et al.

(10) Patent No.: US 8,477,613 B2
(45) Date of Patent: *Jul. 2, 2013

(54) METHOD AND ARCHITECTURE FOR A SCALABLE APPLICATION AND SECURITY SWITCH USING MULTI-LEVEL LOAD BALANCING

(75) Inventors: Kumara Das Karunakaran, Santa Clara, CA (US); M S Badari Narayana, Santa Clara, CA (US)

(73) Assignee: Rockstar Consortium US LP, Plano, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 13/267,667

(22) Filed: Oct. 6, 2011

(65) Prior Publication Data

US 2012/0087240 A1 Apr. 12, 2012

Related U.S. Application Data

(63) Continuation of application No. 12/685,505, filed on Jan. 11, 2010, now Pat. No. 8,130,645, which is a continuation of application No. 11/305,555, filed on Dec. 16, 2005, now Pat. No. 7,672,236.

(51) Int. Cl.
| | |
|---|---|
| *H04L 12/56* | (2006.01) |
| *H04L 12/46* | (2006.01) |
| *H04J 3/00* | (2006.01) |

(52) U.S. Cl.
USPC .................. 370/230.1; 370/235; 370/401

(58) Field of Classification Search
USPC ............... 370/230.1, 231, 235; 709/203, 228
See application file for complete search history.

(56) References Cited

U.S. PATENT DOCUMENTS

| | | | |
|---|---|---|---|
| 6,223,205 B1* | 4/2001 | Harchol-Balter et al. | 718/105 |
| 6,510,164 B1* | 1/2003 | Ramaswamy et al. | 370/466 |
| 7,047,300 B1 | 5/2006 | Oehrke et al. | |
| 7,181,527 B2* | 2/2007 | Valenci et al. | 709/234 |
| 7,257,616 B2* | 8/2007 | Bass et al. | 709/203 |
| 7,301,933 B1* | 11/2007 | Baggs et al. | 370/352 |
| 7,369,557 B1* | 5/2008 | Sinha | 370/392 |
| 7,376,125 B1* | 5/2008 | Hussain et al. | 370/352 |
| 7,596,621 B1* | 9/2009 | Knee et al. | 709/230 |
| 7,719,966 B2 | 5/2010 | Luft et al. | |
| 8,015,303 B2 | 9/2011 | Osman et al. | |
| 2006/0018329 A1* | 1/2006 | Nielsen et al. | 370/401 |
| 2006/0112235 A1* | 5/2006 | Cabot et al. | 711/141 |
| 2006/0233101 A1* | 10/2006 | Luft et al. | 370/229 |
| 2007/0070904 A1* | 3/2007 | King et al. | 370/235 |
| 2007/0088974 A1* | 4/2007 | Chandwani et al. | 714/6 |
| 2007/0109968 A1* | 5/2007 | Hussain et al. | 370/232 |
| 2007/0143546 A1* | 6/2007 | Narad | 711/130 |

* cited by examiner

*Primary Examiner* — Chi Pham
*Assistant Examiner* — Ahmed Elallam
(74) *Attorney, Agent, or Firm* — Robert D. McCutcheon

(57) ABSTRACT

A switch architecture and method provides scaling through multi-level load balancing of flows across data and application processing planes. An input/output module receives a communication session flow (forward) from a client device and selects one of a plurality of data processors to process the flow. The selected data processor determines the level of processing for the forward flow and selects an application processor from a plurality of such application processors. The application processor generates a session structure identifying actions to be performed on the forward flow and transfers the session structure to the selected data processor to perform the actions on the forward flow. The application processor also predictively generates and offloads a session structure for the associated reverse flow. If the reverse session structure is offloaded to a different data processor, either the forward or reverse flow redirects packets, or is redirected, to the data processor hosting the other flow.

6 Claims, 3 Drawing Sheets

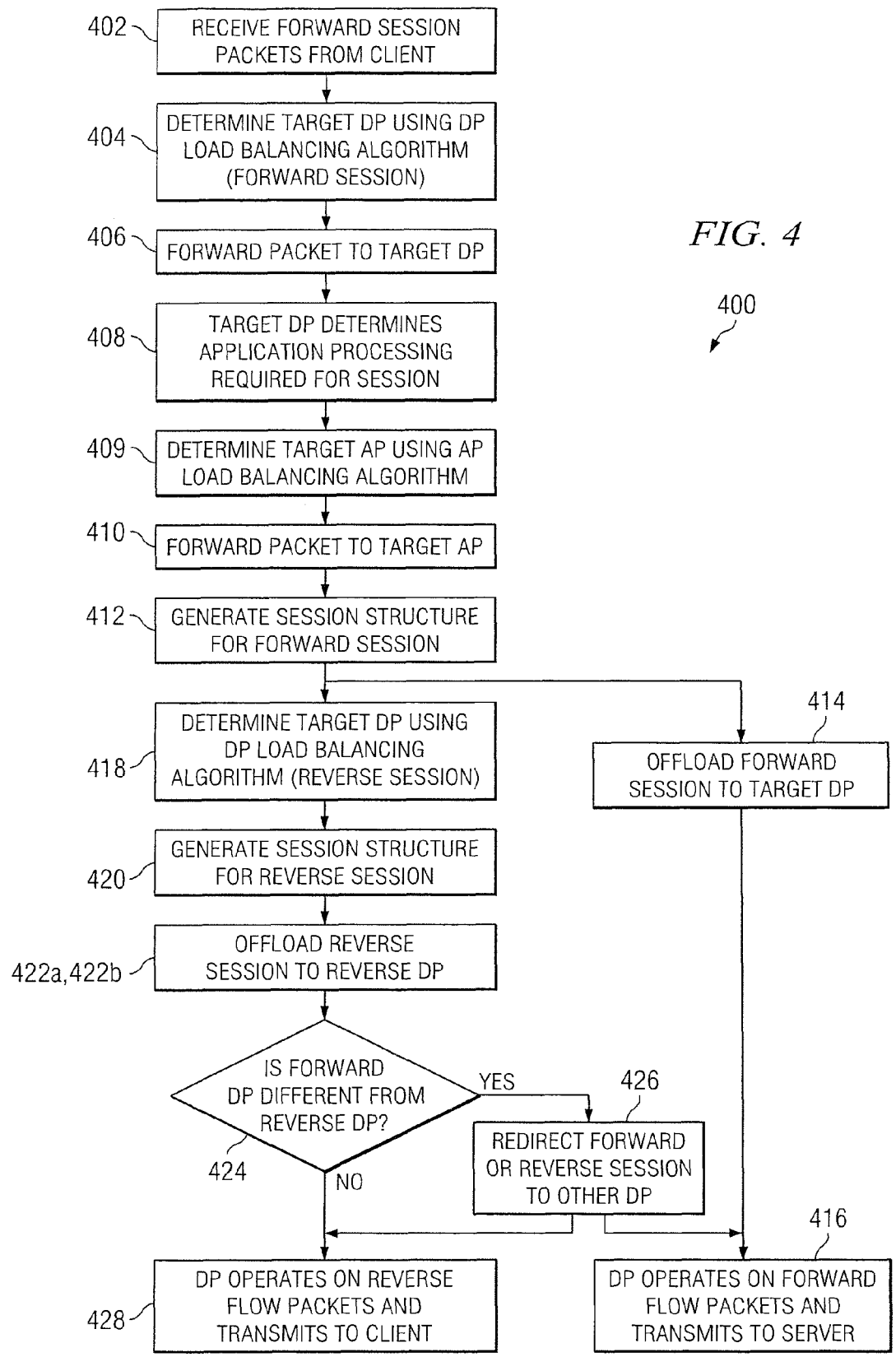

METHOD AND ARCHITECTURE FOR A SCALABLE APPLICATION AND SECURITY SWITCH USING MULTI-LEVEL LOAD BALANCING

CROSS-REFERENCE TO RELATED APPLICATIONS

This application is a continuation of prior application Ser. No. 12/685,505 filed on Jan. 11, 2010 now U.S. Pat. No. 8,130,645, which is a continuation of prior application Ser. No. 11/305,555 filed on Dec. 16, 2005 (now U.S. Pat. No. 7,672,236), which are incorporated herein by reference.

TECHNICAL FIELD

The present invention relates generally to communication networks, and more particularly to a method and architecture for a scalable application and security switch within a network environment.

BACKGROUND

Deep packet inspection (DPI) provides an inspection and filtering function applied to received data packets for providing security, load balancing and application optimization. DPI examines the header and data portion of a packet (usually Layer 4 through Layer 7) searching for specific or illegal statements or data to determine whether the data packet should be forwarded and/or the policies to be applied (e.g., allow/deny, load balance, encrypt, etc.). The application or functionality of DPI may also be applied to identify flows instead of packet by packet analysis.

Prior art DPI switches included multiple data processing cores with attached local memory in a distributed environment with a shared backplane and used a load-balancing algorithm for distributing incoming traffic flows. Load-balancing was performed in software by the processing data core(s). This consumed significant and valuable processing power, added latency, and increased connection bandwidth due to an added hop between processing cores. In addition, this architecture was not readily scaleable.

One possible solution to provide scalability is to have a global flow manager which assigns every flow to one data plane CPU—based on some criteria such as the current load on the data plane CPUs. When a data plane CPU receives a packet which does not have an associated session, the packet is directed to the global flow manager. The global flow manager becomes the central clearing house for managing flows and performs load-balancing and offloading of sessions on demand. The problem with this architecture is that the global flow manager may become a bottle neck and multiple packet exchanges between the global flow manager and the data plane CPUs increases backplane traffic.

Another possible solution is to process the packets at the ingress module without load-balancing. Though this reduces backplane extra hops, it causes uneven loading based on traffic patterns, which results in wasted CPU and memory resources in some modules while other modules are heavily burdened. This is also not practical when route changes occur or multiple routes exist to the same destination. This may result in the forward and reverse flow processing occurring in different data plane CPUs which is incorrect or undesirable for many applications.

Accordingly, there is needed a method and architecture for a multi-application switch that provides scalability, load balancing, a reduction in CPU processing, and optimization of connection bandwidth overhead in the processing of data packets.

SUMMARY

In accordance with one embodiment of the present invention, there is provided a switch having a first I/O interface coupled to a backplane, the first IO interface operable for receiving one or more packets in a forward flow from a first client device. A plurality of data processors, each data processor communicatively coupled to the first I/O interface via the backplane, is operable for operating upon received forward flow packets. An application processor communicatively coupled to the plurality of data processors via the backplane is operable for generating a session structure including instructions for processing received forward flow packets. The first I/O interface device is further operable for executing a data processor load balancing algorithm and selecting a target one of the plurality of data processors to process the forward flow packets. The application processor is further operable for transferring the session structure to the selected data processor for processing the forward flow packets processors.

In another embodiment, there is provided a method of load balancing communication connection sessions received at an application switch. A forward flow of a communication session is received from a source device. One of a plurality of data processors is selected to process the forward flow in accordance with a data processor load balancing algorithm based at least in part on source/destination information in the forward flow. The forward flow is transmitted to the data processor selected to process the forward flow and a level of application processing needed for the forward flow is determined. The forward flow is transferred to an application processor capable of providing the determined level of application processing. A forward session structure for the forward flow is generated that identifies one or more actions to be performed on the forward flow and the forward session structure is offloaded to the selected data processor for processing the forward session flow in accordance therewith. The method further includes predictively offloading processing of a reverse flow associated with the forward flow to one of the plurality of data processors.

Furthermore, a computer program performing one or more of these methods is embodied on a computer readable medium and operable to be executed by a processor or within a switch.

Other technical features may be readily apparent to one skilled in the art from the following figures, descriptions, and claims.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which:

FIG. 4 is a flow diagram of an example method for processing a new flow or session highlighting the scalability of the architecture.

DETAILED DESCRIPTION

Figure 1:
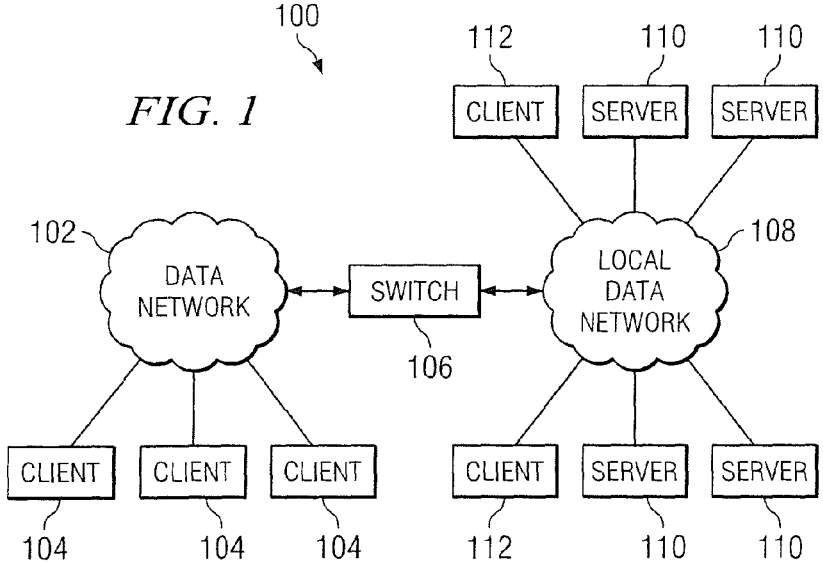
FIG. 1 illustrates an example data communications network or system in which the present invention may be used or implemented.

FIG. 1 illustrates an example data communications network or system 100 in accordance with the present invention. The system or network 100 shown in FIG. 1 is for illustration purposes only. Other embodiments of the system 100 may be used without departing from the scope of this disclosure.

In this example, the system 100 includes a data network 102, a local area network (LAN) 108, and a switch 106 communicatively coupled to both networks 102, 108. The data network 102 includes one or more client devices 104 communicatively coupled to the network 102. The LAN 108 includes one or more servers 110 providing various functions or applications, and may further include one or more client devices 112. In a typical scenario, a client device 104 seeks access or communication (a flow or session) with a server 110 or a client device 112 (or vice versa). The communications path between these devices travels through the switch 106 which acts as a gateway or exit/entrance point for the LAN 108. In the embodiment shown, the switch 106 functions as an edge security device for the LAN 108 providing security functions and access to the various devices of the LAN 108. This is but one configuration of a system that implements the methods and switch 106 of the present invention—other systems or configurations utilizing the present invention are contemplated and within the scope of this disclosure.

The network 102 may include one or more local area networks ("LAN"), metropolitan area networks ("MAN"), wide area networks ("WAN"), all or portions of a global network such as the Internet, or any other communication system or systems at one or more locations, or combination of these. Further, the network 102 (and system 100) may include various servers, routers, bridges, and other access and backbone devices. In one embodiment, the network 102 is a packet network that utilizes any suitable protocol or protocols, and in a specific embodiment, the network 102 (and most components of the system 100) operates in accordance with the Internet Protocol (IP). As will be appreciated, the concepts and teachings of the present invention are not limited to IP, but may be utilized in any data packet network that facilitates communication between components of the system 100, including Internet Protocol ("IP") packets, frame relay frames, Asynchronous Transfer Mode ("ATM") cells, or other data packet protocols. Practically speaking, most data traffic involves IP packets, and when different frame formats or protocols are utilized, these are encapsulated or transmitted within the frame or cells.

Similarly, though the network 108 is shown as a LAN, it may be configured as described above.

The client devices 104, 112 represent any devices that may be communicatively coupled to a data network, including but not limited to computers, modems, PDAs, routers, switches, or any other network devices and the like. Each of the client devices 104, 112 may be constructed or configured from any suitable hardware, software, firmware, or combination thereof for transmitting or receiving information over a network.

The servers 110 may include servers of any type or functionality. This may include, but is not limited to, mail servers, web servers, FTP servers, application database servers, etc. Each of the servers 110 may be constructed or configured from any suitable hardware, software, firmware, or combination thereof for transmitting or receiving information over a network. One or more servers 110, or other servers, may be included within the network 102.

Figure 2:
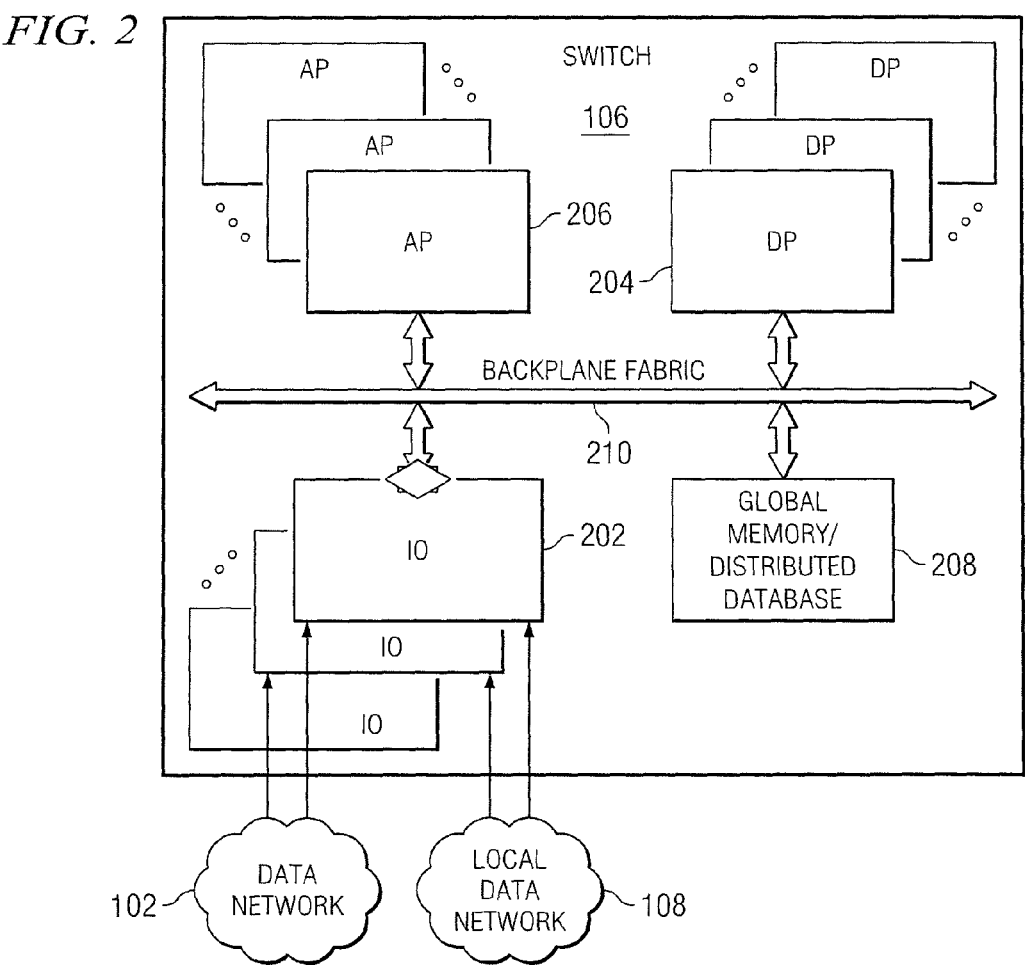
FIG. 2 depicts a block diagram of the DPI switch illustrated in FIG. 1 in accordance with one embodiment of the present invention.

Now referring to FIG. 2, there is illustrated in more detail one embodiment of the switch 106 in accordance with the present invention. The switch 106 includes one or more input/output modules or devices 202 (or I/O interfaces), a plurality of data plane processors (DP) 204 (also referred to as data processors), one or more application processors (AP) 206, a global memory or distributed database 208, and a backplane connection fabric 210 providing interconnection between the components.

In one embodiment, the switch 106 includes numerous card slots coupled to the backplane 210 and operable to receive individual cards (or PCBs). Each card can be configured as a stand-alone or separate I/O module, data processor, or application processor, or provide a combination of functions (e.g., one card may include a combination I/O module, data processor and/or application processor). This feature provides flexibility and scalability to the switch 106. In the event additional IOs 202, APs 204 or DPs 206 are needed to increase certain capabilities, additional card(s) may be added. The architecture of the switch 106 includes a set of IO cards, data plane CPUs, and application processors coupled to a common backplane including some global memory or memory database structure. In one embodiment (as described more fully below), the IO modules 202 load balance the DPs 204, and the DPs 204 load balance the APs 206.

The IO modules 202 function as the interface between the backplane 210 of the switch 106 and the data networks 102, 108 and receive/transmit data packets from/to the respective networks 102/108. Any configuration may be handled, such as FE, GigE, 10GigE, FR, ATM, PPP, IP, etc. The IO modules 202 further implement a data processor load-balancing algorithm initiated when one or more packets of a new flow or communication session (e.g., a bidirectional communication flow between two devices, though it may be possible to have a unidirectional flow) is received at an IO module 202. The algorithm determines/selects a target DP from one of the plurality of data processors 204 as the target DP that will process the new flow. The IO modules 202 may be constructed or configured from any suitable hardware, software, firmware, or combination thereof for providing the noted interfacing and load-balancing functions. As will be appreciated, the term "flow" and "communication session" may be used interchangeable throughout this document. A flow may have a forward flow and a reverse flow. The terms "session" or "session structure" typically refers to the data structure or other structure that represents or controls the flow. A session or session structure may comprise a single structure or multiple structures (such as one each for the forward and reverse flows).

The load balancing functionality of each IO module 202 may be implemented in hardware or firmware at the IC module level. In one embodiment, a hashing method operating on flow or session information or keys (e.g., source/destination addresses, source/destination ports, protocol, etc.) from the data packet produces an index that points to an entry in a table having multiple entries. The load balancing table entries map the indexes to physical DPs 204 available for processing a new flow. For example, if the hashing method generated sixty-four possible indexes, there will be sixty-four entries in the table, and each index points to a respective entry. In the table, each entry identifies one of the n DPs to handle the processing. As a result, a target DP is determined/selected to process the new flow/session. Entries in the table can be filled in upon initial configuration, and may be further modified when necessary, such as when a DP 204 is added or removed from the switch 106. Optionally, the table may include alternate target(s) for each entry, thus allowing the data processors 204 to be provisioned or decommissioned at run time without affecting existing connections, and may reduce or eliminate the need to update the table when DPs axe removed, added, or fail.

In one embodiment, each IO module 202 individually and independently performs the same load-balancing method (as the other IO modules) when a new flow is received. Further, each IO module 202 utilizes its own load balancing table within the module 202. As a further embodiment, the tables within each module 202 are identical.

In another embodiment, a table may be stored globally and accessed when needed by one of the IO modules 202. Further, the hashing method and table lookup may be performed wholly by another device (not shown) in the switch 106 in response to a request and information from an IO module 202, though this may likely increase backplane bandwidth usage.

Utilizing a common load balancing method for all IO modules 202 provides the switch 106 with the capability or benefit to easily direct processing of a new reverse flow (associated with a previously new forward flow) to the same DP handling the forward flow (i.e., session processing) when there are no address translations in the flow. Even when address translations are made, using a common load-balancing method for all IO modules 202 in conjunction with the APs 206, as more fully described below, provides the same capability or benefit. Performing this load-balancing within the IO modules 202 relieves the DPs 204 of this function and allows packets to be delivered directly to the target DP.

The data processors 204 determine the application level processing needed for a new flow and perform processing activities on a flow/session once offloaded by the APs 206. The DPs 204 also perform load balancing to select an application processor 206 from a plurality of APs 206 for processing the flow. Upon receipt of a new flow packet (or packets) from the IO module 202, the target DP 204 determines the application level processing needed by the new flow and selects one AP from several APs using a load-balancing algorithm, based on processing needs, load balancing metrics, etc. Other criteria that may be utilized for load-balancing are generally within the knowledge of those skilled in the art.

In one embodiment, the data processors 204 are special-purpose processors, and may be in the form of a network processor unit (NPU), ASIC with multiple CPUs, FPGA, or the like. General processors may also be utilized, if desired.

The application processors 206 provide processing capabilities for different applications, such as Firewall, Server Load Balancing (SLB), Intrusion Protection System (IPS), Secure Socket Layer (SSL), Virtual Private Network (VPN), AntiVirus, Extended Markup Language (XML) Firewall, VoIP Session Border Controllers, etc. These are examples of application programs executable by the APs 206. Other applications may be utilized. In addition, the APs 206 may share various common resources, including deep packet inspection engines and crypto engines, etc.

Once the target AP 206 is determined, the target DP 204 forwards the new session packet(s) to the target AP 206 for processing. The target AP 206 processing the new flow processes the packets and determines whether the flow is approved or accepted and policies, in the form of actions, that can be applied. The AP 206 also determines actions to be performed on all packets in the new flow. These actions or instructions, in the form of a session or session structure, are transmitted to the target DP 204 which processes or performs these actions on the data flow. This is referred to as "offloading" the session to the data processor 204 for processing the new flow. Once offloaded, the DP 204 handles most, or all, of the processing of the data flow in accordance with the session structure with little input from the AP 206. Thus, once a flow is approved, it is not necessary for the AP 206 to inspect every packet in the flow and most actions on the flow are performed by the target DP 204. It will be understood by those skilled in the art that there may be times when further processing or deep packet inspection of data packet(s) by the AP 206 may be desirable required.

The session structure may include any number and type of actions to be performed on the flow, including actions such as changing a destination address in the packets (to the desired server), using encryption and keys in data packets, searching for patterns, TCP state tracking/monitoring, forwarding of processed packets to IO module(s) (routing), etc.

In addition, if there are multiple servers 110 available as the destination of the new flow (e.g., client 104 to server 110), the AP 206 also selects one of these multiple servers as the target destination for the flow.

A flow of data packets initiated by a client device to a server may be referred to as a forward flow, while the flow from the server back to the client device is referred to as the reverse flow. As will be appreciated, a flow is typically a bi-directional communication session, though the overall communication session between two devices typically has both a forward and a reverse flow. The exact description of which flow is "forward" or "reverse" is not critical. However, as used herein, when a communication session or flow is initiated, the initial flow will be typically identified as the forward flow. However, "forward" or "reverse" may be used interchangeable and simply identify one direction from the other, unless otherwise noted or the context of use would necessitate a specific flow.

As previously described, the target AP 206 receives (after load balancing by the IO modules 202 and load balancing by the target DP 204) the first packet(s) of a forward flow, creates the session structure and offloads processing to the target DP 204. When a destination change exists, there is a significant probability that when the associated reverse flow is received at the switch 106, a DP other than the target DP 204 processing the flow may be selected as the DP to handle the flow. As will be appreciated, it is more efficient for the same DP to receive and process all packets for both the forward and reverse flows.

In accordance with one embodiment of the present invention, the target AP 206 predicts or determines the identity of the DP 204 that will be selected by the load balancing algorithm in the IO modules 202 for the reverse flow. Thus, when offloading the session structure for the forward flow to the target DP 204, the target AP 206 also offloads a session structure for the reverse flow to the predicted DP 204. These may be different or the same session structures. When the destination/source addresses have not changed (e.g., no address translation and the forward and reverse flow source and destination addresses are the same in the packets), the target DP 204 selected for the reverse flow will be the same DP handling the forward flow. As previously described, a session or session structure may comprise a single structure or multiple structures (such as one each for the forward and reverse flows). The forward and reverse flow structures may be generated separately, however, there is typically a single session structure generated for the whole flow.

In the event of an address translation change (e.g., NAT), through its knowledge of the address changes, the AP 206 is able to run the load, balancing algorithm with the changed address(es). The algorithm identifies or "predicts" which target DP 204 would be selected by the IO module 202 when the first packet in the reverse traffic is received at the IO module (e.g., server side IO module). This may alternatively be done prior to receiving packets in the reverse flow by inspecting a few packets in the forward flow. The reverse session (structure) is offloaded to the selected DP 204 for processing the reverse flow. This is referred to as "predictive offloading." Typically, the same or substantially the same session structure is generated in response to the reverse flow as is generated in response to the forward flow (but they may be different).

When DPs are different for the forward or reverse flows (or session structures), either the forward or reverse session DP redirects packets to the DP hosting the other session so that all processing for a given communication session (both forward and reverse flows) occurs at a single DP 204. This provides bi-directional state information in a single data processor for doing stateful processing. In one embodiment, the session structure offloaded to the predicted DP 204 comprises an instruction to forward any received reverse flow packets to the other DP 204 (but additional actions/instructions may be included). Optionally, the redirect mechanism also provides a means to relocate the processing to another processor (another DP or other different processor) having special capabilities, such as compression, encryption, etc.

In another embodiment, the redirect mechanism instructs the IO module 202 that receives packets (either reverse or forward flow) to send them to the other DP 204. For example, the IO module 202 will be instructed to send packets destined for the predicted DP 204 to the target DP 204. This way use of fabric bandwidth may be reduced.

Alternatively, the AP 206 may check first to determine whether the target and predicted DPs 204 for the flow are the same before offloading a session structure. If same, the session structure (possibly a combined session structure) is of to the target DP 204. If different, the AP 206 offloads one session to the target DP 204 and the other session to the predicted DP 204. As described, the session offloaded to the predicted DP 204 is typically a redirect session that includes actions or instructions for the predicted DP 204 to redirect any reverse flow packets received thereto to the target DP 204.

The global memory 208 may include any type of memory, and optionally may be implemented as a global synchronized database, accessible to APs 206 and DPs 204. The memory/database stores global states (e.g., rate limits, bandwidth usage/port or per vlan, statistics, configuration information, etc.) which may be utilized to enforce global limits in the switch 106. In another embodiment, the memory 208 may also store the load balancing information or tables for use by the IO modules 202, DPs 204 and/or APs 206.

The backplane fabric or interconnection bus 210 provides interconnection paths between the components of the switch 106. This may include one or more common and/or dedicated communication lines or buses providing data and control packet transmission.

The architecture and method of the present invention provides scalability advantages. The number of IO modules 202 may be increased to handle higher external bandwidths and different LAN configurations. The number of DPs 204 may be increased to provide additional CPU processing power, thus scaling the throughput of the switch 106. Additional APs 206 may be added to increase application capacity. Since new sessions (or connections) are established by APs 206 in this architecture and method, the number of connections per second is further scalable.

Figure 3:
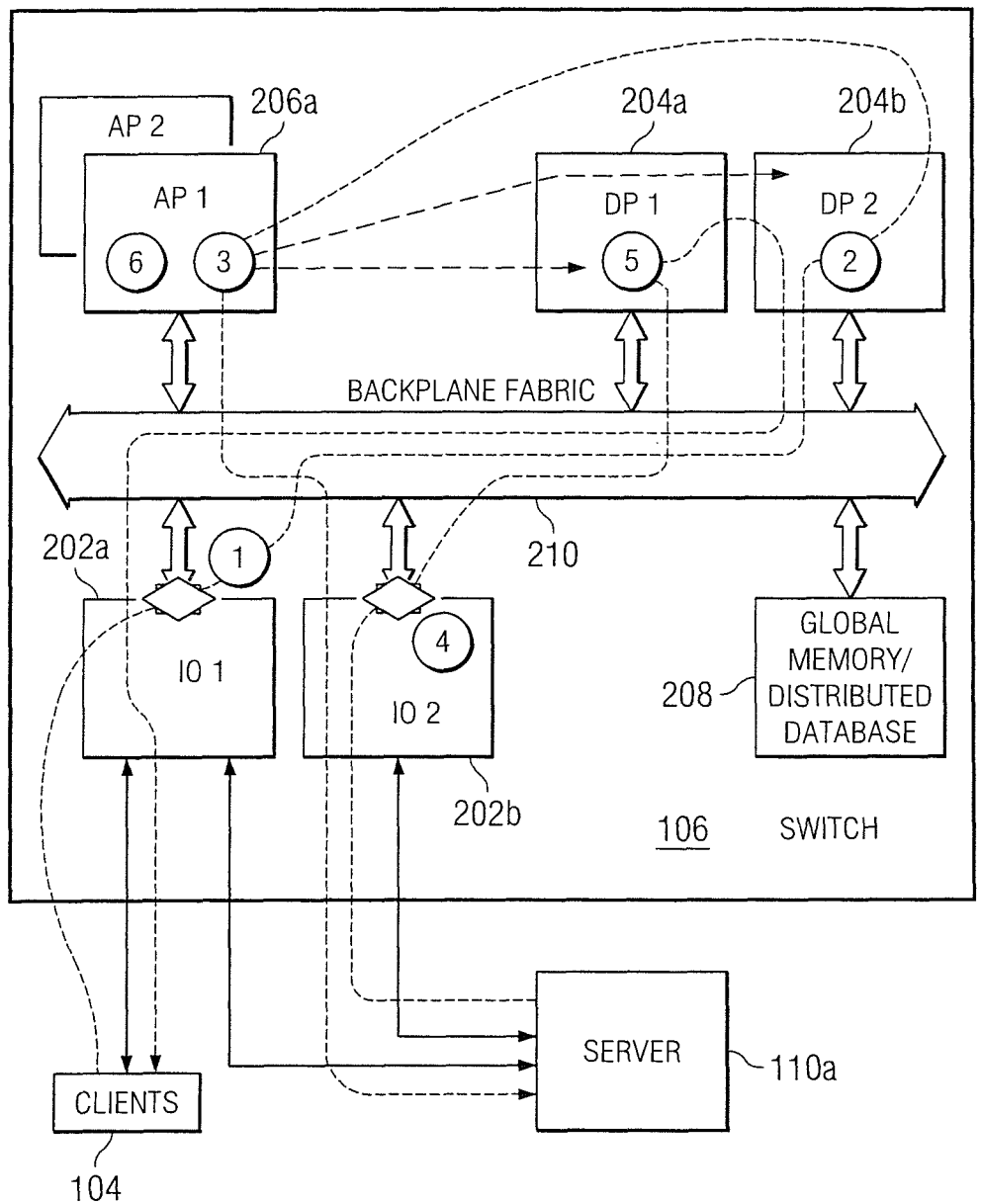
FIG. 3 is a diagram of one example of a new flow or session in accordance with the present invention as shown in relation to the elements described in FIG. 2.

Now referring to FIGS. 3 and 4, there is illustrated a method 400 and example of a new flow or connection between a client device 104 and a server 110a, as shown with respect to the components in the switch 106 (FIG. 3) and within the method 400 (FIG. 4).

The client device 104 generates and transmits a first packet (or packets) to initiate a forward flow (forward traffic) over the network 102. An IO module 202a receives the packet (step 402), performs the DP load balancing algorithm (as previously described) at the IO module 202a and selects one of the DPs 204 as the target DP for processing the forward flow/session (step 404). The packet is forwarded to the selected DP 204, which as illustrated in FIG. 3, is the DP 204b (DP2) (step 406).

From packet information, the DP 204b determines the level of application processing required to process the packets in this new forward flow (step 408). The DP 204b performs an AP load balancing algorithm to select one of the APs 206 as the target AP to provide the application processing for the flow (step 409). The packet is forwarded to the selected AP 206, which as illustrated in FIG. 3, is the AP 206a (AP1) (step 412).

The AP 206a receives the packet and generates a session structure (described previously) for the forward flow (step 412). During this process, the AP 206a also selects or identifies one of the servers 110 as the destination for the forward flow. Also, the AP 206a typically performs additional processing or steps to authenticate or approve the requested flow or connection. In the example shown, the selected server 110, which as illustrated in FIG. 3, is the server 110a. The session structure is then offloaded or transferred to the forward flow DP 204b (step 414). The packet may also be transferred to the DP 204b and operated upon in accordance with the actions or instructions of the offloaded session structure. Forward flow packets received at the IO module 202a (from the client) are forwarded to the DP 204b, operated upon in accordance with the forward session structure by the DP 204b, and forwarded to the server 110a (step 416).

In addition, the AP 206a performs predictive offloading for the reverse flow of the communication session. The same DP load balancing algorithm (as previously described and utilized by the IO modules) is performed by the AP 206a to select one of the DPs 204 as the target DP for processing the reverse flow (step 418). Since the AP 206a has access to address translation information utilized in the forward flow, it uses this information in applying the DP load balancing algorithm to predict which target DP 204 will be selected by the IO module 202b (or the applicable IO module receiving the reverse flow from the server 110a) when the IO module 202b receives the reverse traffic (server 110a to client).

Once the reverse flow target DP 204 is identified, which as illustrated in FIG. 3, is the DP 204a (DP1), the AP 206a generates a session structure (described previously) for the reverse flow (step 420).

The AP 206a checks whether the DP selected for the forward flow is the same as the DP selected for the reverse flow (step 424). The reverse session structure is then offloaded or transferred to the reverse flow DP 204a (steps 422a or 422b). In some instances, these DPs selected are the same. When this occurs, both forward and reverse session structures have been offloaded to the same DP (separate or combined), thus packets associated with these related forward (from client to server) and reverse flows (from server to client) are forwarded by the respective 10 module(s) to the same DP. At the DP, the packets are operated upon by the DP in accordance with the respective session structures and transmitted back to an appropriate IO module (for transmission to the respective server or client) (steps 416 and 428).

When the DPs selected are different, both forward and reverse session structures have been offloaded to different DPs, thus packets associated with these related forward (from client to server) and reverse flows (from server to client) are forwarded by the respective IO module(s) to different DPs. As noted above, it is desirable to process both related flows (and session structures) (forward and reverse) at the same DP. The present invention provides for a means, mechanism or method to redirect the processing of either the forward or reverse session structures and flows to the DP hosting the other flow (step 426) (and as further described above). After redirection to a single DP 204, packets are operated upon by the DP in accordance with the respective session structures and transmitted back to an appropriate IO module (for transmission to the respective server or client) (steps 416 and 428).

Other variations and processes are possible. The reverse flow may be offloaded to the DP 204 while the forward flow may be inspected completely in AP 206. The reverse flow may change in the middle of a connection or communication session and the AP 206 will remove the reverse flow from the predicted DP 204 (reverse flow) and select a new server and offload a new reverse flow to the other predicted DP 204. Also, the flows may be retained and processed in the AP 206 by offloading an instruction to "forward to AP_n" in the forward and reverse DPs 204. Further, some actions of the session structure may be performed by the DP(s) 204 and some by the AP 206.

In general terms, the present invention provides a scalable multi-application switch architecture and method for multi-level load-balancing flows. When a communication session or flow is initiated by a source device, the IO module receiving the initial packet(s) performs a load balancing algorithm to select one of a plurality of data processors to process the flow and associated session structure. The selected data processor optionally applies another load balancing algorithm to select one of a plurality of application processors that executes one or more applications in relation to the flow. When the destination device for the flow is a server having a particular function and a plurality of such servers are available, the application server selects a server as the destination device, generates a session structure (for the forward session) that includes actions or instructions for the data processor, and offloads processing of the session structure to the data processor.

With knowledge of the source and destination address/route information of the forward session, the application processor performs the same load balancing application (as the IO modules) to predict the data processor that would be selected by the IO module(s) when the first packet of the reverse traffic is received. The application processor generates a session structure for the reverse session and offloads processing to the predicted data processor. When the data processors for the offloaded forward and reverse sessions are different, one of the flows is redirected to the data processor hosting the other flows. This is typically accomplished by offloading a redirect session to the data processor which redirects any received data packets to the other data processor. This allows the switch to perform load balancing of the data and application processors and redirection of the processing to a single data processor when load balancing would result in processing of the forward and reverse flows (or session structures) by different data processors.

In some embodiments, certain functions and methods performed by the switch 106 implemented or supported by a computer program that is farmed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. In this document, the term "couple," "connect" and their derivatives refer to any direct or indirect communication between two or more elements, whether or not those elements are in physical contact with one another.

While this disclosure has described certain embodiments and generally associated methods, alterations and permutations of these embodiments and methods will be apparent to triose skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An application switch comprising:
    a first I/O interface coupled to a backplane, the first I/O interface configured for receiving one or more packets in a forward flow from a first client device;
    a plurality of data processors, each data processor communicatively coupled to the first I/O interface via the backplane and configured for operating upon received forward flow packets;
    an application processor communicatively coupled to the plurality of data processors via the backplane, the application processor configured for generating a session structure including instructions for processing received forward flow packets; and
    wherein the first I/O interface is further configured for executing a data processor load balancing algorithm and selecting a target one of the plurality of data processors to process the forward flow packets, and the application processor is further configured for transferring the session structure to the selected target data processor for processing the forward flow packets and for predictively offloading processing of a reverse flow associated with the forward flow to one of the plurality of data processors.

2. The switch in accordance with claim 1 wherein the session structure comprises one or more actions to be performed on the forward flow packets.

3. The switch in accordance with claim 1 wherein the application processor is further configured for:
    selecting one of the plurality of data processors to process the reverse flow in accordance with the data processor load balancing algorithm;
    generating a reverse session structure for the reverse flow that identifies one or more actions to be performed on the reverse flow; and offloading the reverse session structure to the data processor selected to process the reverse flow.

4. The switch in accordance with claim 3 wherein selecting one of the plurality of data processors to process the reverse flow is based at least in part on source/destination information related to the forward flow.

5. The switch in accordance with claim 3 wherein the application processor is further configured for redirecting the reverse flow to the selected target data processor.

6. The switch in accordance with claim 3 wherein the reverse session structure comprises a redirection session for instructing the data processor selected to process the reverse flow to redirect data packets of the reverse flow to the selected target data processor.

* * * * *